Nov. 3, 1953 A. N. GOLDSMITH 2,658,102

COLOR MICRO-FACSIMILE SYSTEM

Filed Dec. 31, 1949 2 Sheets-Sheet 1

INVENTOR
Alfred N. Goldsmith
BY
ATTORNEY

Nov. 3, 1953 A. N. GOLDSMITH 2,658,102

COLOR MICRO-FACSIMILE SYSTEM

Filed Dec. 31, 1949 2 Sheets-Sheet 2

INVENTOR
Alfred N. Goldsmith
BY
ATTORNEY

Patented Nov. 3, 1953

2,658,102

UNITED STATES PATENT OFFICE 2,658,102

COLOR MICRO-FACSIMILE SYSTEM

Alfred N. Goldsmith, New York, N. Y., assignor to Radio Corporation of America, a corporation of Delaware Application December 31, 1949, Serial No. 136,217

2 Claims. (Cl. 178—5.2)

This invention relates to the high speed transmission and reception of facsimile material wherein the original subject matter is transmitted by television methods, either a frame, or up to a line at a time, and wherein reception is accomplished by corresponding television methods with recording of the received material in relatively minute dimensions. Such recorded material is thereafter viewed through a magnifying device or in the form of an enlarged reproduction as may be desired. More particularly, the present invention has for its principal object the provision of an improved color micro-facsimile system whereby the received subject matter is capable of being recorded or viewed in colors which are representative of the colors of the original subject matter.

The expression "color micro-facsimile" as hereinafter used is intended to indicate a process whereby the original subject matter is transmitted, either a frame, or up to a line at a time, by color-television methods and in each of the corresponding component-color (primary color) and key-image color separation images, and wherein reception is accomplished by color-television methods of each of the color separation images, either a frame or up to a line at a time as required by the method of transmission, the received image being recorded on a greatly reduced scale (in itself unreadable by the naked eye) either on color-photographic material or by other color reproducing processes, and the resulting image being enlarged for direct viewing or for reproduction in actual use. In some cases, the above process may be modified to the extent that the received intelligence is utilized by the high-speed color-facsimile recorder of my copending application Serial No. 783,074, filed October 30, 1947, now U. S. Patent No. 2,609,440 granted September 2, 1952, to produce directly a full-size reproduction of the original subject matter.

In a first embodiment of the present invention, light representative of the subject matter is applied to a beam splitter. From this beam splitter are derived a plurality of identical images each of which is focused at a different television camera. Each of these cameras is adapted, by means of a color filter or by the character of its photoelectric mosaic, to respond to a different color of light.

If simultaneous transmission of the color-separation signals corresponding to each image point is desired, the video output currents are supplied to separate transmitters and thence to a common antenna from which the video signals are radiated.

If simultaneous-sequential transmission of the color separation signals corresponding to each picture element are to be sent in rapid sequence and within the traverse of a single scanning line, the video outputs of all but one of the cameras are channeled to the corresponding transmitters through delay circuits having constants such that the corresponding output signals of the camera are transmitted one after the other. Thus the (usually three) signals for a given picture element are transmitted successively within a time less than the time of the traverse of a single scanning line, and possibly as brief as the time of the traverse of a single picture element. (In this last case, a single wideband transmitter may be advantageously used to carry all the component-color signals, and a single wideband viewer to pick them up.)

The signals thus transmitted are in general received at an antenna from which they are delivered to a tuner and channel separator device. The signals thus separated are each delivered to a different reproducer or image tube. The images produced by these tubes are each projected through a different color filter to a beam assembler which functions to bring the different beams into registry at a record medium upon which they are recorded in minute form. As shown in Figure 4 of my Patent 2,275,898, the record so produced may be thereafter guided through a film processing apparatus and thence to a viewing or projecting device by which an image of it is enlarged to readable proportions. Alternatively the signals may be received by the recorder disclosed in the aforesaid copending application for directly producing a readable copy of the original subject matter.

In a second embodiment of the invention, the color-separation signals, for each component color, are transmitted for a complete frame as a unit. Thus the signals corresponding to the different colors of a given frame are transmitted one after the other. In this embodiment of the invention, an image of the subject matter is focused at the camera and the signals representative of the different colors are produced by a color disc which is rotated in the path between the subject matter and the camera. The resulting video output signals are radiated by an antenna and are received at a receiver where they are supplied to a tuner and thence to a black-and-white picture tube or kinescope of conventional type. The images thus produced are projected through a color wheel synchronized to that in the transmitter and thence to a recording medium upon each frame of which the differently colored images of each frame of the subject matter are successively recorded in superimposed and diminutive form. (For subtractive-color records, the recording of each component-color signal is carried out in the complementary color.) Alternatively the received signals may be supplied to the recorder of the aforesaid application for producing a readable or microscopic record of the subject matter.

In carrying out the various processes which have been briefly described, it is of course necessary that means be provided for maintaining synchronism between the various parts of the color microfacsimile system. Such means are essential to the operation of the present invention but are not described in detail for the reason that they are well known to those skilled in the art and would unnecessarily complicate the disclosure of the invention. Such means may be similar to those disclosed by my Patent 2,275,898 or to any other suitable means which are conventional in this art.

The invention will be better understood from the following description considered in connection with the accompanying drawings and its scope is indicated by the appended claims.

Referring to the drawings.

It will be readily appreciated that the various components of these various circuits are well known to those skilled in the art. In order to make the following description more explicit as to these components, reference is herein made to publications wherein a detailed description of some of them may be found. The present invention, however, relates more particularly to new combinations of such components which are capable of effecting results not heretofore realized in the art.

Figure 1:
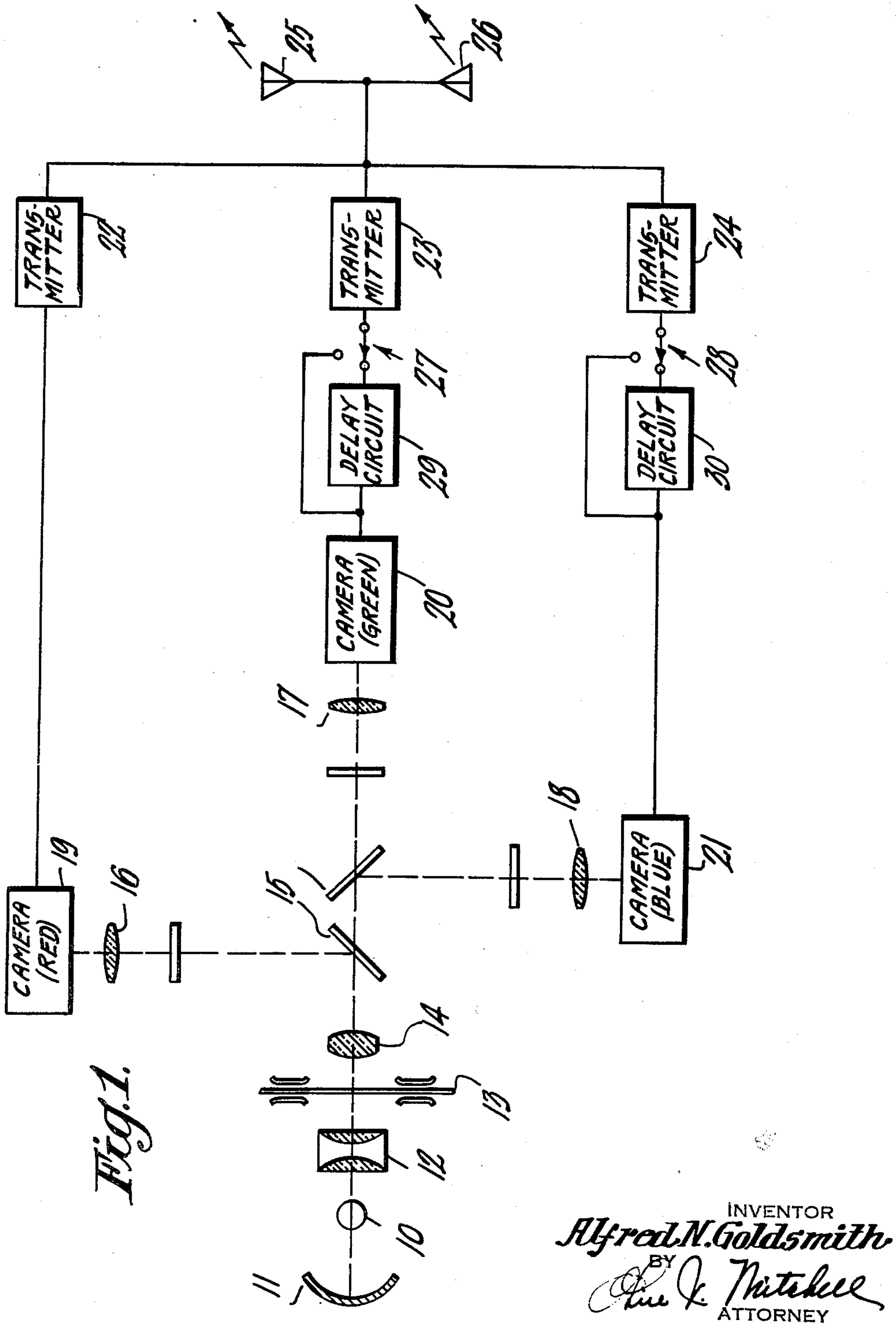
Figure 1 is a block diagram illustrating a transmitting circuit which is adapted to deliver color-separation signals representative of each image point either simultaneously or successively depending on whether delay circuits are connected between certain of the cameras and the transmitters to which the video outputs of these cameras are delivered.

The color micro-facsimile transmitting system of Figure 1 includes a light source 10 and a reflector 11 from which a beam of light is projected through a lens 12 to a strip 13 bearing the subject matter to be transmitted. Light representative of such subject matter is projected through a lens 14 to a beam splitter 15 including a pair of semi-reflectors. It functions to provide three separate and identical images of the subject matter recorded on the exposed area of the strip 13.

These separate images are each projected through a different lens 16, 17 or 18 to a different camera 19, 20 or 21 each of which is made responsive to differently colored light either by the character of its photoelectric mosaic or by means of a suitable color filter. The cameras 19, 20 and 21 may be of any suitable type, several of which are now conventional in the art. For example, it may be like those disclosed in the aforesaid Patent 2,275,898 both as to its general construction and as to the means associated with it for synchronizing the movement of the strip 13 and the scanning of its target or photoelectric mosaic.

The video current outputs of the cameras 19, 20 and 21 are supplied respectively to the transmitters 22, 23, and 24, and thence to the antennas 25—26 from which signals representative of the differently colored images are radiated. If the switches 27 and 28 are in their upper closed positions, the signals representing the differently colored images of one or more picture elements are radiated simultaneously.

It is to be noted that, by optical or electrical adjustments of the cameras 19, 20, 21, either the same picture element may be scanned in the various primary colors at any given instant or, without departing from my invention, different systematically selected elements may simultaneously be scanned in the respective primary colors. As soon as the line or frame scanning is completed for all the primary colors, the results will be identical regardless of the selection of simultaneously scanned elements.

If color-separation signals corresponding to each picture element of the subject matter are to be radiated within a period equalling the time of traverse of one or more scanning lines, however, the switches 27 and 28 are in their illustrated closed position. In this position, a delay circuit 29 is connected between the camera 20 and the transmitter 23 and a delay circuit 30 is connected between the camera 21 and the transmitter 24.

It is apparent that the delay circuits 29 and 30 must be so designed that they are free from objectionable frequency and phase distortion of the video signals delivered to the cameras 20 and 21. Suitable forms of these delay circuits are well known in the electric network art. The delay circuit 29 has constants such that it retards the video output of the camera 20 by an amount equivalent, purely for example, to one-third the time of traverse of a single scanning line. The output of the camera 21 is then retarded by the circuit 30 by an amount equivalent to two-thirds of the time required for the traverse of a single scanning line. Thus the signals representing the different colors of an element of the subject matter are radiated one after another within a period equalling the time of a single traverse of this element.

Figures 2, 3, 4:
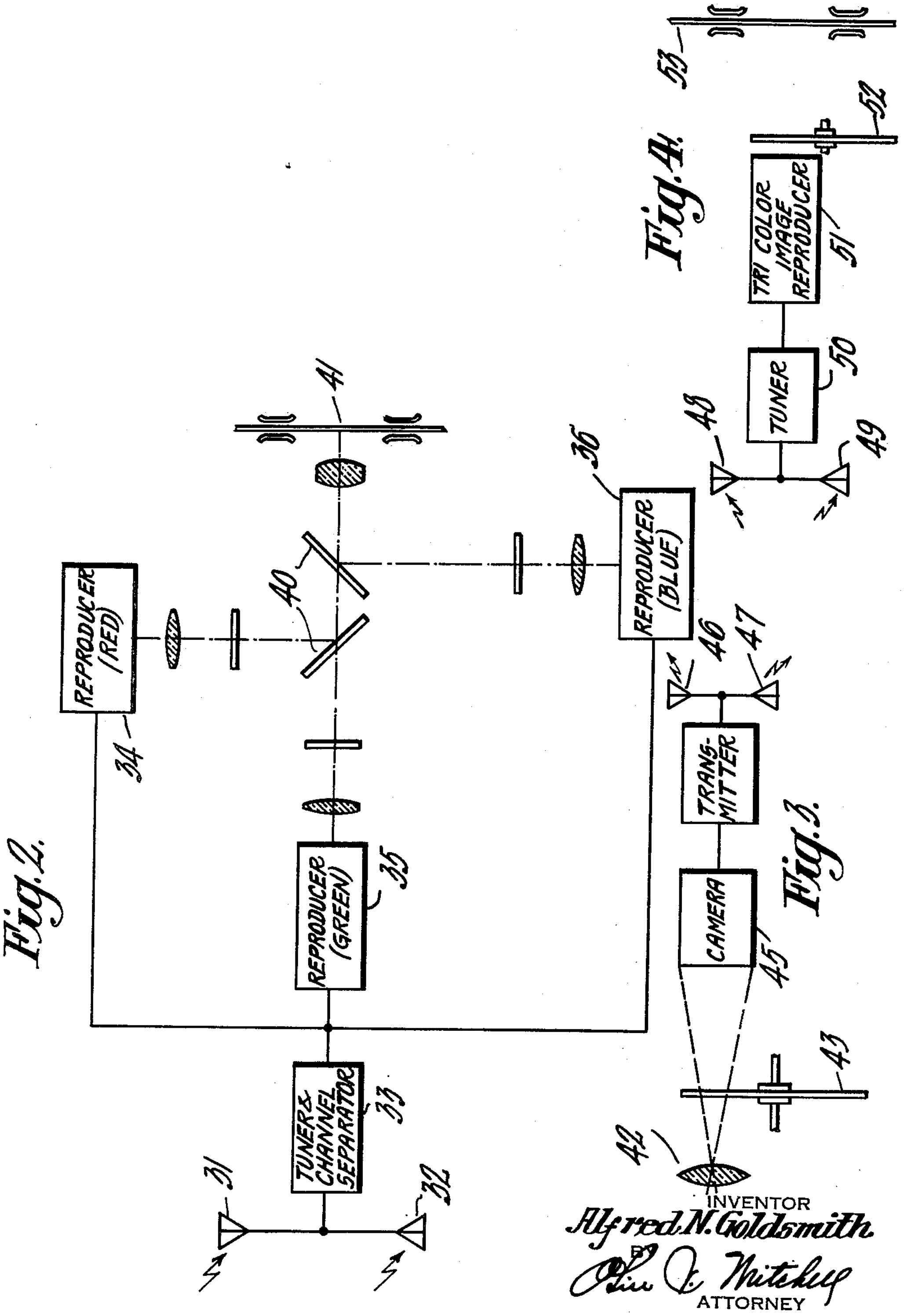
Figure 2 illustrates a circuit adapted to receive the signals radiated by the circuit of Figure 1.
Figure 3 illustrates a circuit adapted to transmit color-separation signals, for each component color, with a complete frame as a unit. In this case, the signals each representing a different color of the same frame are transmitted one after another and each successive frame is handled in the same manner.
Figure 4 illustrates a circuit adapted to receive the signals transmitted by the circuit of Figure 3.

The signals radiated from the transmitter circuit of Figure 1 are received by the receiver circuit of Figure 2.

The receiver of Figure 2 includes an antenna 31—32 from which the color-separation signals and a synchronizing signal are delivered to a tuner and channel separator 33. The channel separator is well known, and may be either a radio-frequency tuning selector, or a heterodyne device enabling channel selection at the resulting intermediate frequencies. Signals each representative of a different color of the subject matter are thus delivered respectively to the reproducers 34, 35 and 36. These reproducers may be of any suitable type such as usual black-and-white picture tubes carrying filters of a color complementary to the color of the corresponding pickup filter at the transmitter.

The differently colored images produced by the reproducers 34, 35 and 36 are projected to a beam assembler 40 which includes a pair of semi-reflectors arranged as illustrated. Its function is to bring into exact registry, at the record medium 41, the differently colored images projected from the reproducers 34, 35 and 36.

The means for maintaining synchronism between the transmitter of Figure 1 and the receiver of Figure 2 may be similar to those disclosed by the aforesaid patent 2,275,898. As previously indicated, the received subject matter may be recorded in diminutive form and means may be provided for developing and projecting the record as disclosed by the aforesaid Patent 2,275,898. Alternatively, the received color-separation signals may be applied to the recorder of the aforesaid Patent 2,609,440 to provide a record of the subject matter. In either case, it is to be noted that the final color image reproduction is of the subtractive type.

The transmitter circuit of Figure 3 is adapted to transmit color-separation signals, for each component color, for a complete frame as a unit. Thus signals representative of the different colors of the frame are transmitted one after the other. This result is accomplished in a manner similar to that disclosed in Figure 3 of my aforesaid Patent 2,275,898. Alternatively it may be accomplished in the manner disclosed by my Patent 2,423,769.

The illustrated form of the transmitter of Figure 3 includes a lens 42 and a color disc 43 through which light from the subject matter (not shown) is applied to the photoelectric mosaic of a camera 45. This camera may be of the forms currently known as an iconoscope, or as an image orthicon or other equivalent storage type of camera tube. The video output of the camera 45 is delivered to a transmitter (including a video modulator), and thence to an antenna 46—47 from which there are radiated successive groups of color-separation signals, each signal of each group representing a different color of the subject matter, and each group representing a complete color frame. After the subject matter has been scanned successively in each of the component colors, the next subject matter is advanced into the scanning position, gate or aperture; a signal indicating the completion of a frame color scanning is radiated; and the process is then repeated.

The signals thus radiated are received by the antenna 48—49 of Figure 4 and supplied to the input of a tuner circuit 50 of any suitable type such as that normally used in present television reception, but capable of accepting a band width of frequencies corresponding to the transmission from antenna 46, 47. The output of the tuner 50 is supplied to a multicolor image reproducer 51. This reproducer is the usual sequential color television equipment comprising a black-and-white picture tube, a color filter disc 52 synchronized electrically with disc 43 of Figure 3, and associated deflection and beam-amplitude control circuits of conventional character. The color-separation images produced by it are projected either directly through the color disc 52 to a record medium which is handled in any suitable manner such as that outlined by the aforesaid Patent 2,273,898, especially as applied to Figure 4 of that patent. If the color disc 52 is omitted, the record appears on the record medium 53 in black and white. With the color disc 52 interposed between the color-separation images and the medium 53, and rotated in synchronism with the color disc 43 of Figure 3, the record 53 is made to be truly representative of the subject matter.

Means of indicating color synchronism through special signals and of ensuring exact registry between the component color images formed on successive printing cylinders are such as those disclosed by my Patents 2,602,016 granted July 1, 1952 and 2,609,440. If the recording technique of Patent No. 2,602,016 is used, it is necessary to provide as many recording cylinders as there are component colors so that a single frame is recorded in a first component color which then passes in exact registry over the cylinder on which the second component color is subtractively recorded, and so on. If the technique of Patent No. 2,609,440 is used, the recording process is similar except that the component colors are recorded additively. In either case, of course, the record medium must be of the color responsive type.

What the invention thus provides is a color microfacsimile system whereby the subject matter may be recorded in diminutive form and in colors which are truly representative of the colors of the subject matter.

What is claimed is:

1. A color-micro-facsimile system which comprises: means for forming a plurality of component color images of subject matter to be transmitted; means for scanning each of said images to produce substantially simultaneous signals, each of said signals being representative of one of said component color images; and delay means associated with at least one of said signal-producing means for delaying said signal an amount of time not in excess of the time of a single scanning line, such that said signals are adapted to afford registration of said component color images in a recorder having mechanical phase displacement of its recording elements.

2. A color-micro-facsimile system which comprises: means for forming a plurality of component color images of a subject; means for scanning each of said images to produce substantially simultaneous signals, each representative of one of said component color images; means for delaying one of said signals a predetermined amount of time less than the time of a single scanning line; and means for delaying another of said signals an amount of time different from the delay of said first signal but not in excess of a single scanning line, such that said signals are adapted to afford registration of said component color images in a recorder having mechanical phase displacement of its recording elements.

ALFRED N. GOLDSMITH.

References Cited in the file of this patent

UNITED STATES PATENTS

| Number | Name | Date |
|---|---|---|
| 2,073,370 | Goldsmith | Mar. 9, 1937 |
| 2,275,898 | Goldsmith | Mar. 10, 1942 |
| 2,296,908 | Crosby | Sept. 29, 1942 |
| 2,335,180 | Goldsmith | Nov. 23, 1943 |
| 2,373,114 | Goldsmith | Apr. 10, 1945 |
| 2,423,769 | Goldsmith | July 8, 1947 |
| 2,545,325 | Weimer | Mar. 13, 1951 |